United States Patent [19]

Johnson

[11] 4,147,194

[45] Apr. 3, 1979

[54] TRAVELING HOSE SYSTEM

[75] Inventor: Thomas E. Johnson, Batavia, N.Y.

[73] Assignee: Eaton Corporation, Cleveland, Ohio

[21] Appl. No.: 827,527

[22] Filed: Aug. 25, 1977

[51] Int. Cl.² ............................................. A01G 23/08
[52] U.S. Cl. .............................. 144/309 AC; 144/3 D; 242/47.5
[58] Field of Search .................. 242/47.5; 137/355.16, 137/355.17, 355.2; 191/12 R; 144/3 D, 2 Z, 309 AC

[56] References Cited

U.S. PATENT DOCUMENTS

| | | | |
|---|---|---|---|
| 2,201,954 | 5/1940 | Flygare | 242/47.5 X |
| 2,896,659 | 7/1959 | Erickson | 252/47.5 X |
| 2,974,676 | 3/1961 | Hagelthorn | 242/47.5 X |
| 3,403,866 | 10/1968 | Bell et al. | 242/47.5 |
| 3,894,568 | 7/1975 | Windsor | 144/3 D |
| 3,905,407 | 9/1975 | Guy et al. | 144/3 D |
| 4,023,603 | 5/1977 | Jasinski et al. | 144/3 D X |

*Primary Examiner*—Stanley N. Gilreath
*Attorney, Agent, or Firm*—F. M. Sajovec, Jr.

[57] ABSTRACT

A method and apparatus for installing a traveling hose array in a mobile tree harvester. One end of the hose array travels with the extensible delimbing head of the harvester, and a hose reeving system including a movable trolley is provided to maintain a constant hose length.

The hoses are pretensioned at assembly, and a reeved cable system is provided to maintain tension on the hose array and to return the hose array upon retraction of the delimbing head.

8 Claims, 7 Drawing Figures

TRAVELING HOSE SYSTEM

The present invention relates to an improved method and apparatus for harvesting trees, and more particularly to an improved apparatus for handling certain of the hydraulic hoses necessary for carrying out the harvesting process.

U.S. Pat. No. 3,894,568 discloses a mobile tree harvester of the type which includes a processing boom assembly comprising a telescoping boom assembly, and a processing head which moves along the telescoping boom to delimb a full tree length. The processing head includes a hydraulically actuated delimber and a hydraulically actuated topping shear.

Hydraulic supply to the processing head is maintained by a plurality of hoses which must travel, along with the movable processing head, distances of thirty feet and more. To keep the hoses from fouling prior art harvesters have provided rigging systems which typically include a hose reel mounted on a movable trolley and a reeved cable system for returning the hoses from an extended position to a retracted position.

Problems have been encountered in such rigging systems, in that while provision is made to initially take up slack in the hoses, and to periodically adjust the slack, it is difficult to maintain uniform tension in the hoses, and they tend to jump the grooves provided in the hose reel as one or more of the hoses develops more slack than the remaining hose or hoses. In order to prevent the hoses from becoming fouled on portions of the vehicle when they become slack in use, a plurality of hose guides are generally provided along the side of the machine to support the hoses as they are extended and retracted along the telescoping boom. The presence of such supports, however, tends to bring on a problem in itself in that the branches which are cut off the tree in the delimbing process tend to become fouled in the guides.

An object of the present invention is to provide a method and apparatus for rigging a plurality of movable hoses which will minimize fouling of the hoses in use.

Another object of the invention is to provide a method and apparatus for rigging hoses, as above, which is particularly adapted for use with a movable processing head of a tree harvester.

Another object of the invention is to provide a method and apparatus for rigging hoses in which the hoses are individually pretensioned at assembly to a degree of tension which obviates the need for external guide means to support the hose along its length.

Another object of the invention is to provide a method and apparatus for pretensioning hoses which can be carried out quickly and easily when the machine is assembled.

To meet the above objectives the present invention provides a rigging system in which the hydraulic hoses for the processing head are reeved about a hose reel which includes an independent sheave for each hose. The reel is mounted on a trolley which rides along a track which is a sub-structure of the traveling boom section of the telescoping processing boom. The hoses are extended by the movement of the processing head to which they are attached and returned by a reeved cable acting between the fixed section of the telescoping processing boom and the traveling section. The hoses are pretensioned at assembly by making up the hydraulic connections at each end of each hose, reeving the hoses around their respective sheaves, and with the return cable disconnected, extending the telescoping boom and processing head, thus prestretching the hoses. The return cable is then attached, and its tension adjusted to a predetermined level, maintaining the preset tension in the hoses. The system is then operated normally thereafter. By prestretching the hoses at assembly from about 5% to 15% in excess of their manufactured lengths, depending on the length of unsupported span, it is possible to eliminate the need for further adjustment of hose tension, even after prolonged field use.

Other objects and advantages of the invention will become more apparent from the following description when taken in connection with the accompanying drawings, wherein FIG. 1 is a perspective view of a tree harvester incorporating the invention;

Figure 1:
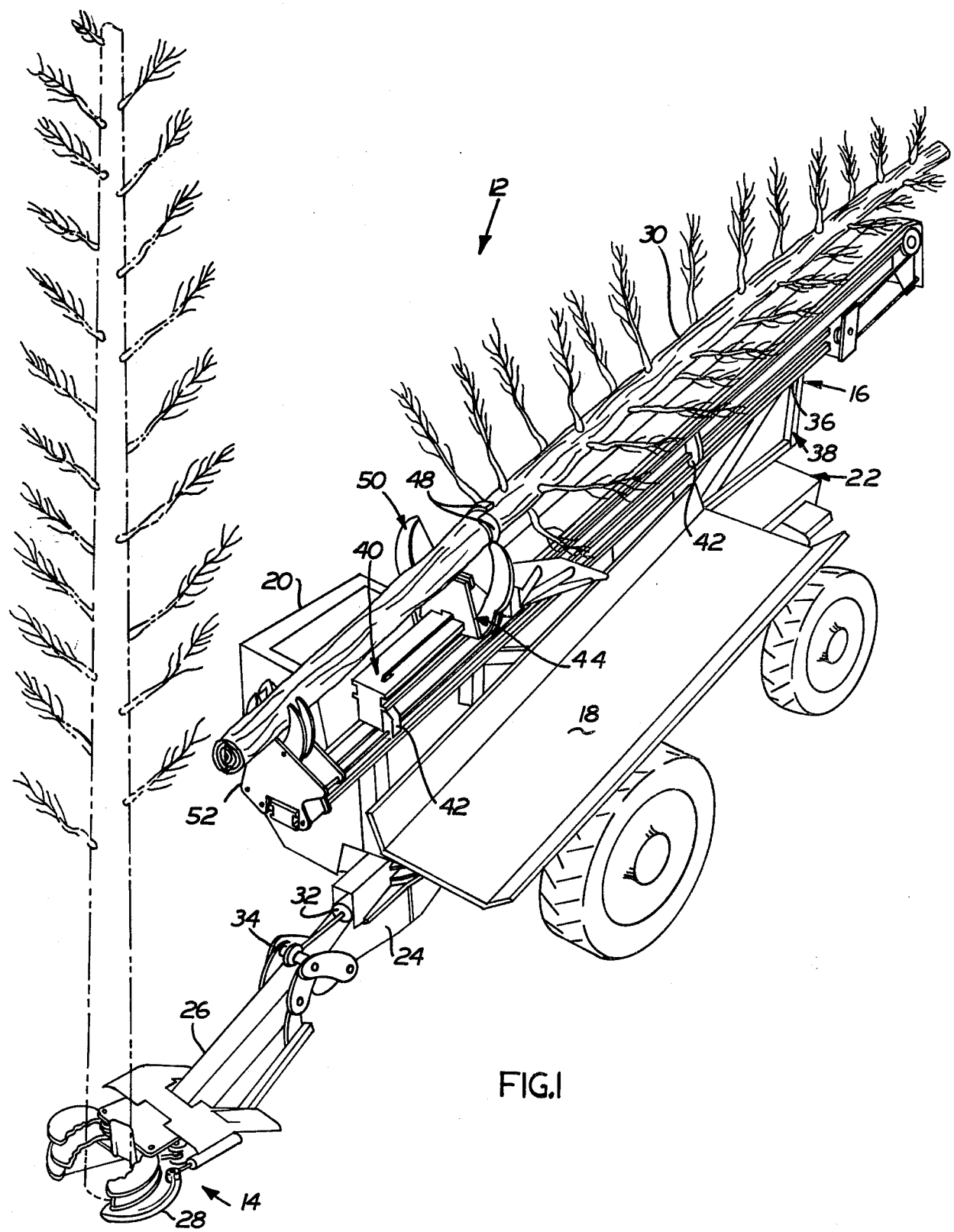

Referring to FIG. 1, there is illustrated a tree length harvester, designated generally by the numeral 12, comprising a felling boom assembly 14, a processing boom assembly 16, a bunk 18, and an operator's cab 20, all of which are mounted on the front frame of an articulated carrier 22.

The felling boom assembly 14 comprises an inner boom section 24, an outer boom section 26, and a felling head 28. The outer boom section 26 is pivotally attached to the inner boom section 24, and is moved from the felling position illustrated to a position for depositing a tree 30 on the processing boom by means of a hydraulic cylinder 32 acting between the carrier frame, and a linkage assembly 34 connecting the inner and outer felling boom sections.

The processing boom assembly 16 comprises a fixed boom section 36 mounted to the carrier frame by means of a support assembly 38, a movable boom section 40 mounted for linear movement relative to the fixed boom section 36 by means of roller supports 42, and a delimbing head 44 mounted on rollers (not shown) for movement along the movable boom section 40. The movable boom section is moved relative to the fixed boom section and the delimbing head is moved relative to the movable boom section by a system comprising a hydraulic cylinder 46 (see FIGS. 6 and 7) acting between the two boom sections and a system of reeved cables acting between the boom sections and the delimbing head, all of which will be described more fully.

The delimbing head 44 comprises a set of delimbing blades 48 engageable with the trunk of the tree 30 to strip the branches off the tree as the delimbing head moves along the movable boom, and a topping shear assembly 50 operable to cut off the top of the tree when a usable tree length has been delimbed.

A clamp assembly 52 can be provided at the forward end of the processing boom 16 to permit a first tree to be delimbed while the felling boom 14 is redeployed to cut a second tree for processing.

Figure 6:
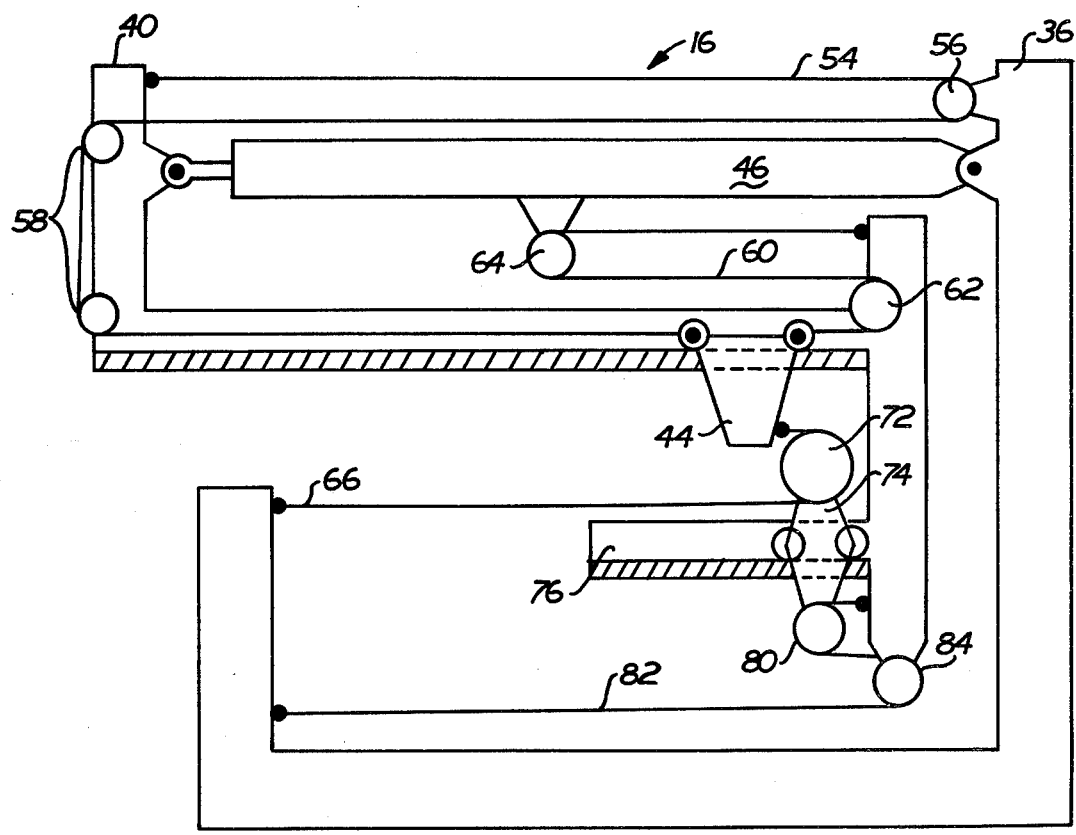
FIG. 6 is a schematic representation of the processing head drive system and the cable rigging system, and the hose handling system in a retracted position.
Figure 7:
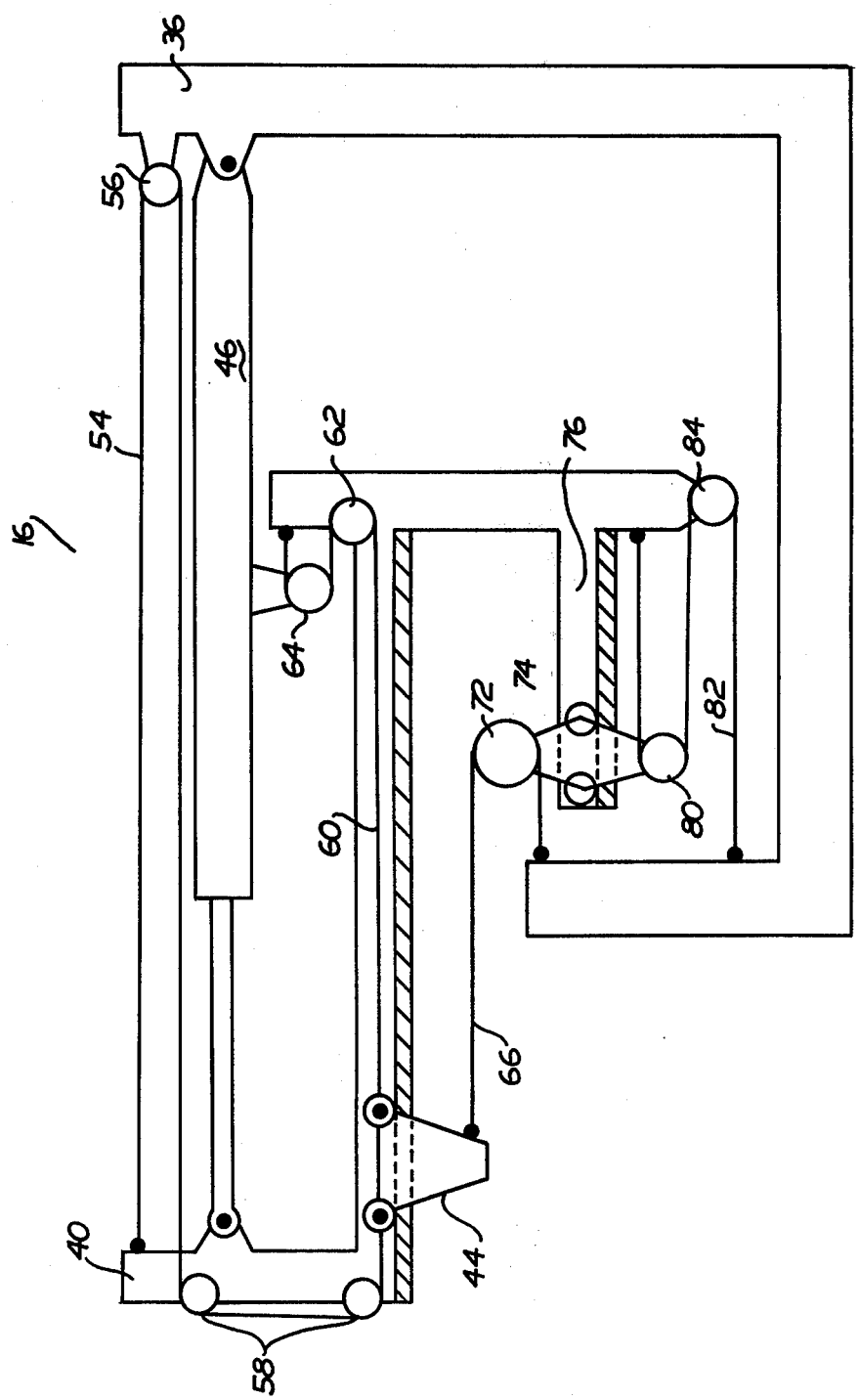
FIG. 7 is a schematic representation similar to FIG. 6 but in an extended condition.

Referring to FIGS. 6 and 7, the processing boom assembly 16 is shown schematically. The cable system for extending the delimbing head comprises an extension cable 54 connected between the movable boom 40 and the delimbing head 44, a first pulley 56 mounted for rotation on the fixed boom 36, and a second pulley 58 mounted for rotation on the movable boom 40. It should be noted that in FIGS. 6 and 7 the second pulley 58 is represented by a pair of pulleys for purposes of illustration. The cable 54 is reeved around the pulleys 56 and 58 such that when the boom cylinder 46 is extended, causing the movable boom 40 to move leftward (as viewed in FIGS. 6 and 7) relative to the fixed boom 36, the movement of the pulley 58 leftward will cause the delimbing head 44 to be drawn leftward along the movable boom. When the cylinder 46 is fully extended, the movable boom 40 and the delimbing head 44 will be in the relative positions shown in FIG. 7. With reference to FIG. 1, on the actual machine 12 when the processing boom 16 is in the condition of FIG. 7, the delimbing head 44 will be extended rearwardly beyond the rear end of the carrier 22, on the order of 32 ft. away from the clamp assembly 52.

The cable system for retracting the delimbing head 44 comprises a retraction cable 60 connected between the movable boom 40 and the delimbing head 44, a first retraction pulley 62 mounted for rotation on the movable boom 40 and a second retraction pulley 64 mounted for rotation on the stationary member of the boom extension cylinder 46.

Figure 2:
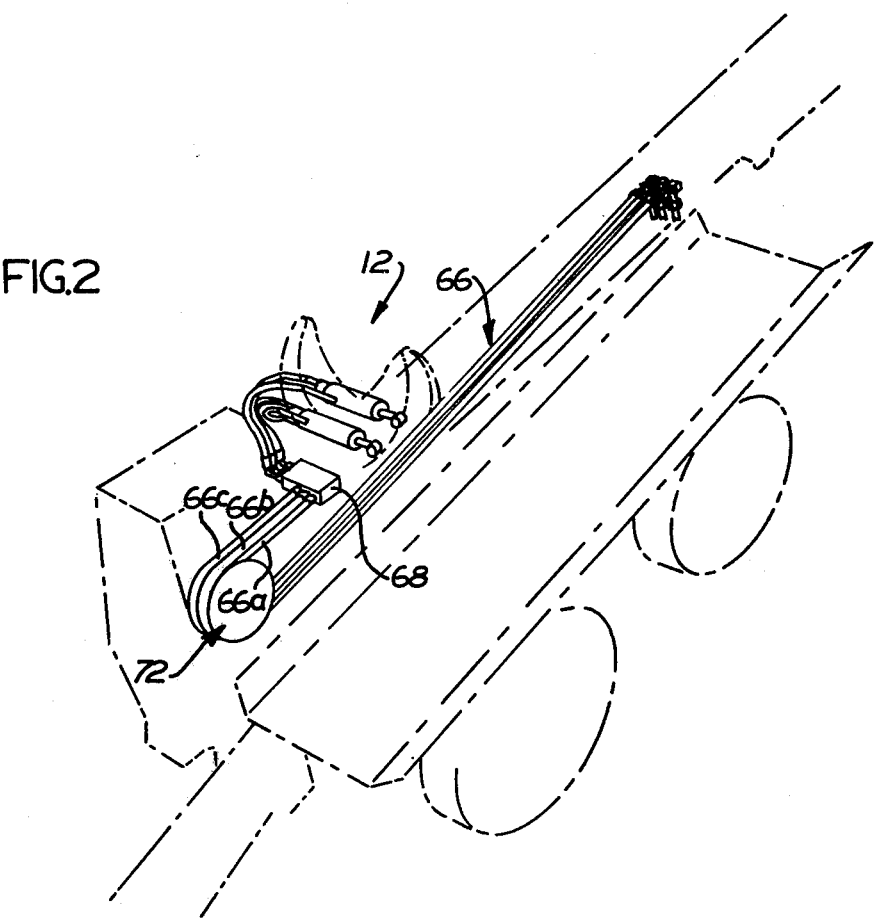
FIG. 2 is a perspective view partially schematically showing the hoses rigged by the inventive method and apparatus.

To provide pressurized hydraulic fluid to the actuating mechanisms of the delimber blades 48 and the topping shear 50, a plurality of hoses must travel with the delimbing head 44 along the processing boom 16. Referring particularly to FIG. 2, a traveling hose array is provided, designated by the numeral 66, comprising a delimb cylinder hose 66a, a topping cylinder hose 66b, and a return hose 66c.

Figure 3:
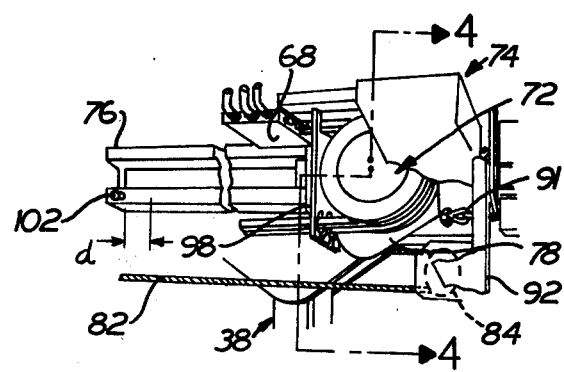
FIG. 3 is a partial perspective view, with parts cut away showing the hose trolley and track of the invention.
Figure 4:
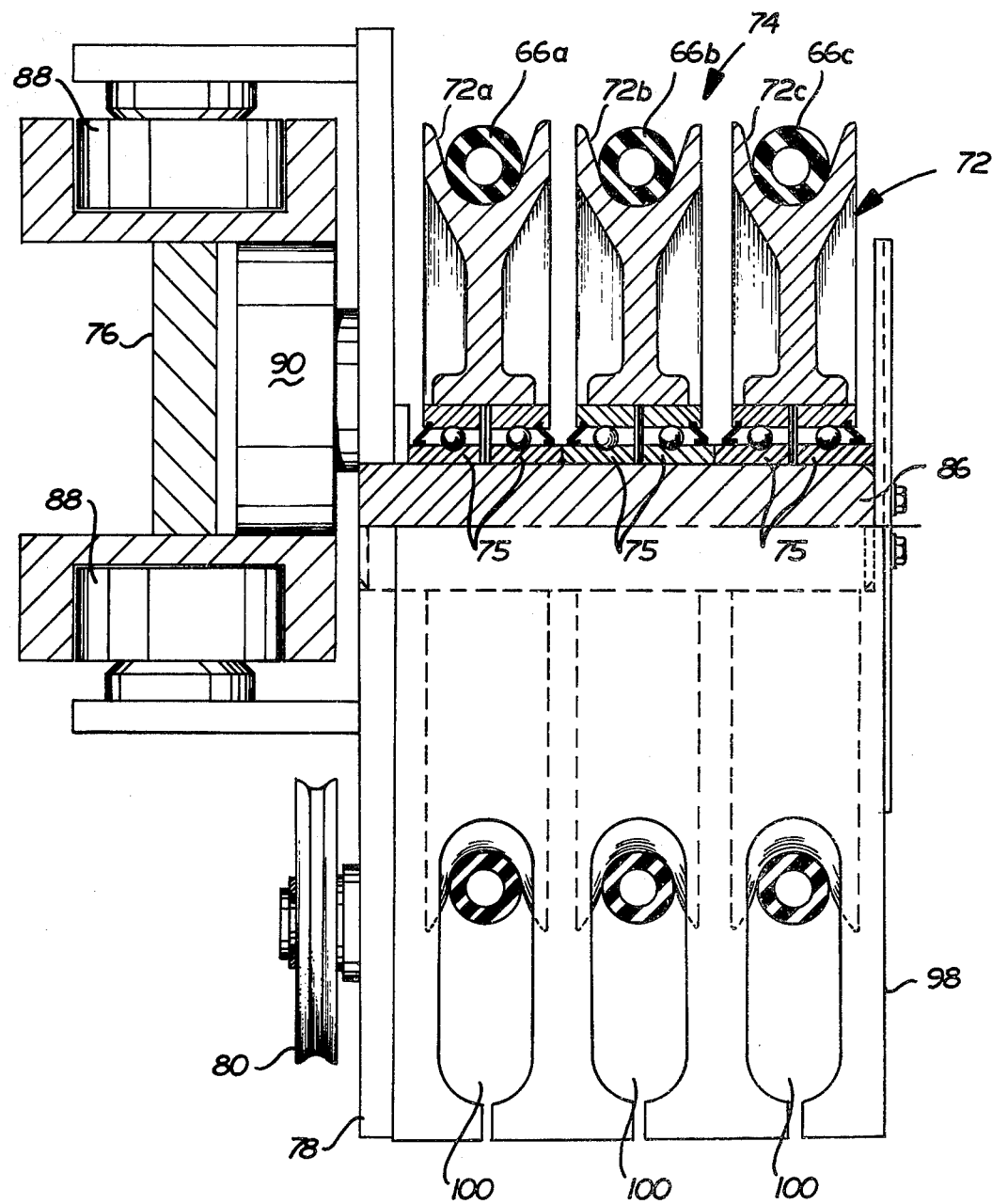
FIG. 4 is a section taken along line 4—4 of FIG. 3.
Figure 5:
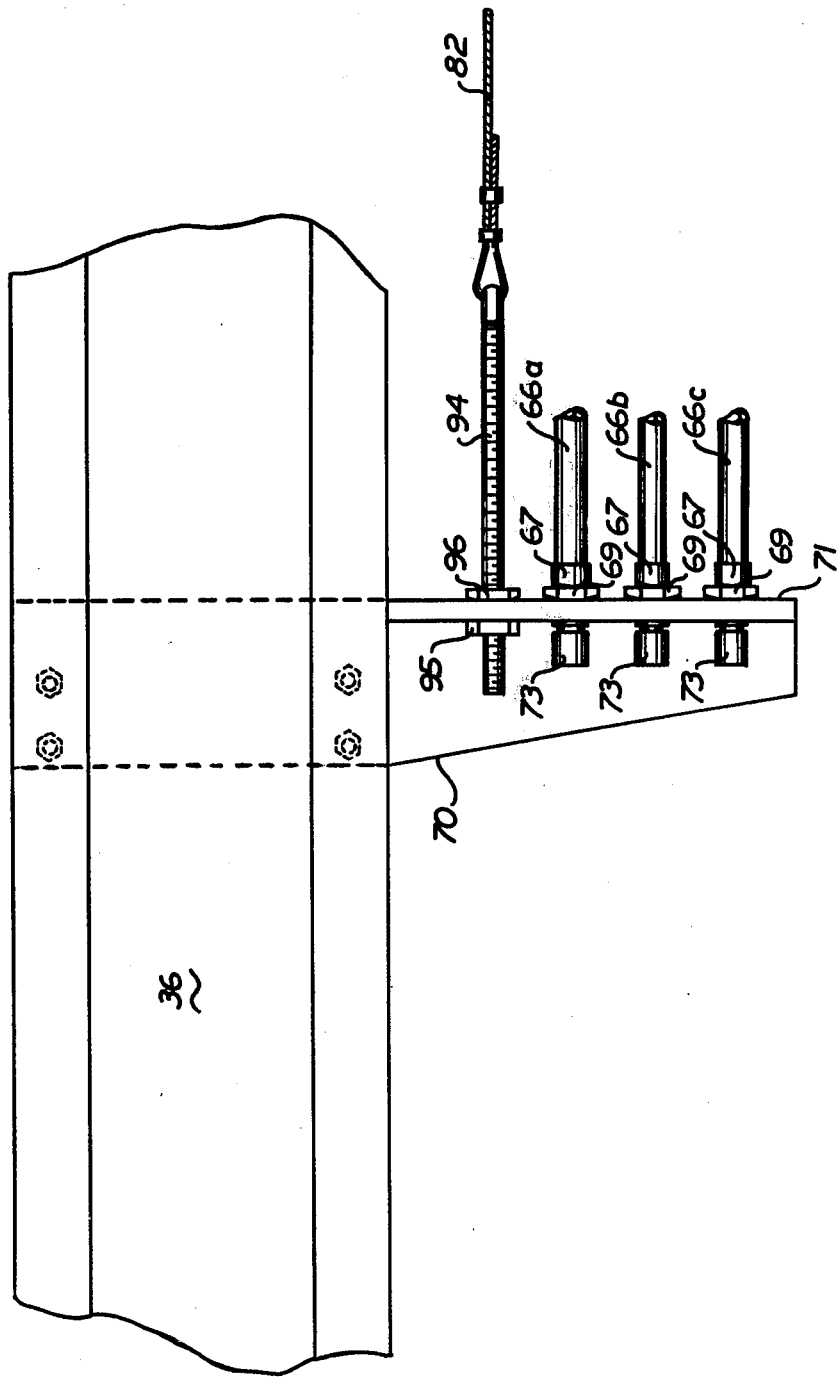
FIG. 5 is a fragmentary plan view showing means for attaching one end of the hoses and return cable of the invention.

The hose array, schematically represented as a single hose 66 in FIGS. 6 and 7, is connected at one end to a manifold 68 attached to the delimbing head 44, and at the other end to a hose bracket 70 attached to the fixed boom 36 (see FIG. 5). At the hose bracket 70 each of the hoses 66a, 66b and 66c has an end fitting 67 attached thereto, which is received in a hole formed in an upwardly extending flange portion 71 of the bracket 70, and secured by nuts 69. Suitable fittings 73, received on the opposite side of the flange 71, connect the hoses 66 to the vehicle hydraulic system in a known manner. The hoses 66 are reeved over a reel or pulley assembly 72 mounted for rotation on a hose trolley 74 which rides on a track 76 fixed to the movable boom 40. Referring to FIGS. 3 and 4, the trolley 74 comprises a frame 78, the pulley assembly 72 mounted for rotation on the frame, and a trolley return cable pulley 80, also mounted for rotation on the frame 78.

When the delimbing head 44 is extended the hose array 66 is pulled along with it, pulling the trolley 74 along by virtue of the reeving of the hoses over the pulley assembly 72. Tension is maintained on the hose array and the hose array is returned when the boom assembly is retracted by means of a trolley return cable 82 which is attached at one end to the movable boom 40, reeved over the cable return pulley 80, doubled back and reeved over an idler pulley 84 mounted for rotation on the movable boom 40, and attached at the other end to the fixed boom 36.

In the illustrated embodiment the pulley assembly 72 comprises a delimb hose pulley 72a, a topping hose pulley 72b, and a return hose pulley 72c, each of which is mounted for independent rotation on individual bearings 75 received on an axle 86 attached to the trolley frame 78. The trolley frame 78 is suspended on sets of rollers 88 and 90, rotatably mounted on the frame 78, which ride on the track 76. Also in the illustrated embodiment one end of the trolley return cable 82 is attached at 91 to a bracket 92, which is welded or otherwise attached to the movable boom 40, the bracket 92 also carrying the idler pulley 84. Also attached to the trolley frame 78 is a plate 98, having a plurality of slots 100 formed therein, which is mounted slightly to the rear of the pulley assembly 72. The hoses 66 are threaded through the slots 100, and the plate 98 serves as a guard, preventing any debris which may adhere to the hoses from walking the hoses out of the pulleys 72.

Referring to FIG. 5, the opposite end of the trolley return cable 82 is attached to a threaded rod 94 which extends through a hole formed in the flange 71 of the bracket 70. The rod 94 is adjustable relative to the bracket 70 to adjust the tension of the cable 82, by means of nuts 95 and 96 received on opposite sides of the flange 71.

To install the hose array 66, the individual hoses 66a, 66b and 66c are first made up by cutting each hose to a length which is 5% to 15% shorter than the actual reeved length between the manifold 68 and the hose bracket 70 (reeved length being defined as the actual length, considering the loops over the applicable pulley, between the hose attachment points), and attaching the end fittings 67. With the cable 82 disconnected from the hose bracket 70 and the delimbing head 44 partially extended, the hoses 66 are connected to the manifold 68, reeved over the pulley assembly 72, threaded through the slots 100 formed in the plate 98, and attached to the fittings 73 at the hose bracket 70.

At this point a stop bolt 102 is screwed into a threaded hole formed in the trolley track 76 a predetermined distance inward from the rearward end of the track as shown in FIG. 3.

The movable boom 40 is then advanced, along with the delimbing head 44 as described above, by pressurizing the cylinder 46 until the full advancement of the delimbing head is obtained. As the hoses move with the delimbing head, the hose trolley 74 will move along the track 76 until the trolley contacts the stop bolt 102. Since the reeved length is greater than the actual length of the hose array as made up, the hoses will be stretched from 5% to 15% over their free length.

The cable 82 is then connected by extending the rod 94 through the flange 71 and threading the nut 95 onto the rod. The nut 95 is threaded onto the rod 94, applying tension to the cable 82, until the hose trolley 74 backs off from the stop bolt 102 by a predetermined distance "d" as indicated in FIG. 5. This will apply a predetermined degree of tension in the return cable 82, and insure that upon subsequent extensions of the delimbing head the hose trolley will not contact the stop bolt. After all adjustments are made the nut 96 is tightened against the flange 71 to lock the position of the rod 94.

The hose system described above, including a method for installing a hose array which can be performed in the field as well as at the factory, eliminates the need for periodic readjustment, and does not require a plurality of guides along its reeved length to take up slack. By reeving the hoses over independently rotatable pulleys 72a, 72b, and 72c, changes in tension in each individual hose will not affect the other hoses.

I claim:

1. A method for installing a traveling hose on a tree harvester wherein said hose extends between a stationary member and a movable delimbing head of said tree harvester and is reeved over a take-up reel movable in a path parallel to the path of said movable delimbing head, comprising selecting a hose of a length a predetermined amount shorter than a predetermined reeved distance between said stationary member and said delimbing head, putting said delimbing head in position relative to said stationary member to receive said hose in an unstretched condition; attaching one end of said hose to said delimbing head and the other end to said stationary member with the hose reeved over said take-up reel, extending said delimbing head relative to said stationary member, stopping movement of said take-up reel at a predetermined point in its travel relative to said stationary member, and continuing the extension of said delimbing head to stretch said hose between said stationary member and said delimbing head.

2. A method as claimed in claim 1 wherein said delimbing head is movably mounted on a movable boom member and said take-up reel is mounted on a trolley movable relative to said movable boom member, including maintaining said delimbing head in its extended position, attaching one end of a return cable to said movable boom member and the opposite end of said return cable to said stationary member with said cable reeved over a cable return pulley mounted on said trolley, and applying a predetermined degree of tension to said return cable.

3. A method as claimed in claim 2, including locking said return cable in place when said predetermined degree of tension is obtained.

4. A method as claimed in claim 2 in which the final stretched condition of said hose is obtained by observing the movement of said hose take-up reel as the tension in said return cable is increased and halting the increase of tension in said cable when a predetermined movement of said hose reel is obtained.

5. A method as claimed in claim 1, in which said hose is initially 5% to 15% shorter than the reeved distance between said stationary member and said delimbing head.

6. A method for installing a hose between a stationary member and a movable member adapted to move along a first substantially linear path, said hose being reeved around a take-up reel adapted to move along a second substantially linear path parallel to said first linear path, comprising:
 (a) selecting a hose of a length a predetermined amount shorter than a predetermined reeved distance between said stationary member and said movable member;
 (b) attaching one end of said hose to said movable member, reeving said hose around said take-up reel, and attaching the opposite end of said hose to said stationary member; and
 (c) extending said movable member relative to said stationary member to stretch said hose a predetermined amount between said stationary member and said movable member.

7. A method as claimed in claim 6, in which said hose is initially 5% to 15% shorter than the reeved distance between said stationary member and said movable member.

8. A method as claimed in claim 6, including the steps of:
 (d) fixing a return cable to act between said take-up reel and said stationary member; and
 (e) applying a predetermined degree of tension to said return cable, and locking said return cable in position with said tension applied.

* * * * *